United States Patent Office 3,583,978
Patented June 8, 1971

3,583,978
PREPARATION OF 2,3-DIHYDRO-1H-1,4-BENZODIAZEPINE 4-OXIDES
Giles Allan Archer, Essex Fells, and Leo Henryk Sternbach, Upper Montclair, N.J., assignors to Hoffmann-La Roche Inc., Nutley, N.J.
No Drawing. Filed Sept. 26, 1968, Ser. No. 763,004
Int. Cl. C07d 53/06
U.S. Cl. 260—239                     10 Claims

ABSTRACT OF THE DISCLOSURE 2,3 - dihydro - 1H - 1,4 - benzodiazepine 4 - oxides are prepared from correspondingly substituted 2 -(2 - A-ethyl lower alkylamino) benzophenone, where A is a leaving group, by treatment of the latter compounds with hydroxylamine hydrochloride. The 2,3 - dihydro - 1H-1,4-benzodiazepine 4-oxides are useful as intermediates in the preparation of pharmacologically active 2,3-dihydro-1H-1,4-benzodiazepines by deoxygenation of the former compounds.

BRIEF DESCRIPTION OF THE INVENTION

The present invention relates to the preparation of compounds of the following formula

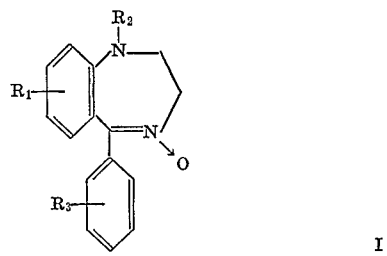

I wherein $R_1$ and $R_3$ each are selected from the group consisting of hydrogen, halogen, trifluoromethyl, nitro, amino, lower alkanoylamino, lower alkylthio, lower alkyl sulfonyl, lower alkylsulfinyl, lower alkoxy, hydroxy, lower alkyl, cyano, carboxy, carbo-lower alkoxy, carbamyl, and di-lower alkylamine; and $R_2$ is selected from the group consisting of lower alkyl, lower alkenyl and lower alkanoyl by a process wherein a compound of the following formula

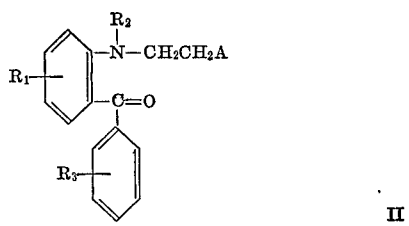

II wherein $R_1$, $R_2$ and $R_3$ are as above and A is a leaving group
is reacted with hydroxylamine.

As used in this disclosure, the term "lower alkyl" comprehends both straight and branched chain carbon-hydrogen radicals having from 1 to 7, preferably from 1 to 4 carbon atoms, such as methyl, ethyl, propyl, isopropyl, butyl and the like. The term "lower alkenyl" includes straight and branched chain carbon-hydrogen radicals having from 1–7, preferably from 1–4 carbon atoms, wherein at least one carbon to carbon bond is unsaturated such as allyl and the like. The term "lower alkanoyl" includes the acyl residue of lower alkanoic acids, for example, acetyl, propionyl, and the like. The term "halogen" encompasses all four halogens, e.g., fluorine, chlorine, bromine and iodine.

In a preferred embodiment of the present invention, compounds of Formula I above are prepared wherein $R_1$ and $R_3$ are selected from the group consisting of hydrogen, halogen, trifluoromethyl and nitro and $R_2$ is lower alkyl. In a more preferred embodiment $R_1$ s halogen, most preferably chlorine and $R_3$ is hydrogen. In the most preferred embodiment, $R_2$ is methyl, $R_1$ is substituted at the 7-position of the benzodiazepine ring and $R_3$ when other than hydrogen is preferably substituted at the 2'-position.

The process for preparing compounds of the Formula I from corresponding compounds of Formula II above by means of a reaction with hydroxylamine or a salt thereof, e.g., hydroxylamine hydrochloride, may be conducted in various ways. In one preferred embodiment, the reaction between compounds of Formula II and hydroxylamine is conducted in a suitable solvent such as aqueous lower alkanol in the presence of a base such as a carbonate, e.g., potassium or sodium carbonate, or an alkali or alkaline earth hydroxide, etc.

The reaction may also be carried out in excess hydroxylamine which serves both as solvent and as base in the reaction. Alternatively, the hydroxylamine may be admixed with an organic base, such as pyridine or triethylamine which serve as solvents and also as added bases. A preferred embodiment of the present invention utilizes as a reaction mixture hydroxylamine hydrochloride in ethanol to which has been added potassium carbonate in water.

The aforeside reaction for the preparation of compounds of Formula I is generally carried out in a temperature range of 0° to the reflux temperature of the solvent medium. In preferred embodiments the aforesaid reaction is conducted at a temperature in the range of from room temperature to the reflux temperature of the solvent medium. The selection of pressure conditions is not critical to the operation of the process of the present invention within normal ranges of pressures generally employed in the laboratory.

The leaving group defined as "A" encompasses for example leaving groups normally employed in the chemical art such as a halogen, e.g., chloro, bromo or iodo substituents, the mesyloxy and tosyloxy groups, etc. In a preferred embodiment, leaving group "A" is preferably selected from the enumerated halogens and most preferably is chloro.

Compounds of Formula II are most readily prepared from compounds of the following formula

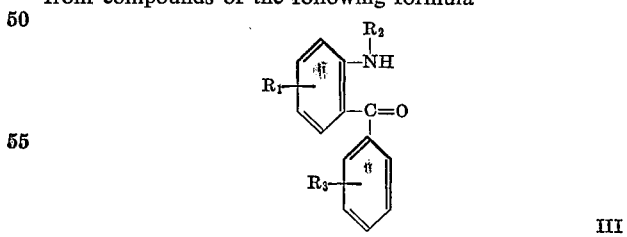

III wherein $R_1$, $R_2$ and $R_3$ are as above.

via an intermediate compound of the following formula

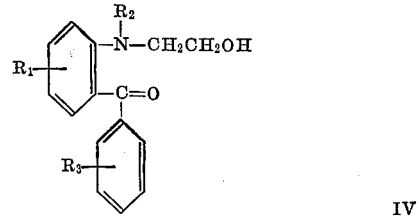

IV wherein $R_1$, $R_2$ and $R_3$ are as above.

Compounds of Formula III are converted into compounds of Formula IV most conveniently by reacting the former with ethylene oxide in the presence of an aprotic Lewis acid such as a Friedel-Crafts catalyst, e.g., boron trifluoride, stannic chloride, titanium tetrachloride, and aluminum chloride. A most preferred catalytic material for the purposes of this reaction is aluminum chloride. Conventional solvents useful in Friedel-Crafts type reactions may be employed. A most preferred class of solvent include the aromatic hydrocarbons such as for example, benzene, xylene, toluene etc. The reaction may be conducted at a temperature in the range of from about 0–45° C., most preferably in the range of from about 30–40° C. However, even higher temperatures may be utilized providing that the system be placed under pressure so as to prevent loss of the volatile ethylene oxide.

It should be noted that when $R_1$ and/or $R_3$ have the meaning amino in the final compound of Formula I above, it is preferred that such compounds be prepared by reduction of the corresponding $R_1$ and/or $R_3$ nitro groups in a manner known in the art subsequent to the ethylene oxide step. This is due to the fact that amino substituents in compounds of the Formula III would react with the ethylene oxide reagent. Thus, subsequent conversion of the nitro group to the amino group after the ethylene oxide step is indicated.

Transformation of compounds of Formula IV into corresponding compounds of Formula II will, of course, proceed in alternative fashion, depending upon the nature of leaving group "A." In the case where leaving group "A" is one of the three enumerated halogens, a halogenating agent can be utilized in this reaction. Suitable halogenating agents include for the case of chlorine, thionyl chloride, phosphorus trichloric, phosphorus pentachloride, etc. In the bromine embodiment, hydrogen bromide or phosphorous tribromide are suitable reagents whereas hydrogen iodide is the reagent of preference for the iodine embodiment. The tosyl or mesyl halides form a preferred group of reagents useful for insertion of the tosyloxy or mesyloxy groups as members of leaving group "A." In the reaction of compounds of Formula IV with the respective leaving group reagents, any solvent inert to the reactants may be utilized. Examples of such solvents include halogenated hydrocarbons such as methylene chloroform, etc. and the aromatic hydrocarbons such as benzene, toluene, xylene, etc. A temperature in the range of from 0° C. to 200° C. preferably from 0° C. to boiling point of the reaction medium is used. It is also possible to utilize the leaving group reagent in excess as the solvent medium. In such instances a temperature in the range of from about 0° to 150° C. may be employed.

Compounds of the following formula

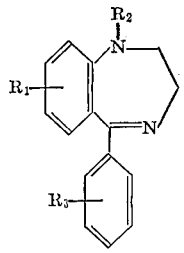

V wherein $R_1$, $R_2$ and $R_3$ are as above
are known to be valuable therapeutic agents and are useful as muscle relaxants, sedatives and anti-convulsants.

Compounds of Formula I are readily converted into compounds of Formula V by a reduction step whereby the oxygen atom on the 4-nitrogen is reductively substituted with a hydrogen atom. The aforesaid reduction reaction may be carried out catalytically in the presence of hydrogen utilizing conventional hydrogenation catalysts such as Raney-nickel for this purpose. In a more preferable embodiment, especially when substituents $R_1$ and/or $R_3$ encompass groups sensitive to catalytic reduction, a chemical reducing agent such as phosphorus trichloride is employed. In the latter embodiment, a temperature in the range of from about 0° C. to the reflux temperature of the reaction medium is utilized. Conventional inert solvents for this reduction step can be employed. Suitable solvents include, for example, the halogenated hydrocarbons such as methylene chloride, chloroform, etc. or the aromatic hydrocarbons such as, for example, benzene, toluene, xylene, etc.

The following examples are illustrative but not limitative of the invention. Other embodiments will be obvious to those skilled in the art and are comprehended by the scope of the invention. All temperatures are stated in degrees centigrade, and all melting points are corrected.

EXAMPLE 1

Conversion of 5-chloro-2-(2-chloroethylamino)benzophenone into 7-chloro-2,3-dihydro-1-methyl-5-phenyl-1H-1,4-benzodiazepine 4-oxide To a solution of 5-chloro-2-(2-chloroethylamino)benzophenone (2 gm., 6.5 mM.) in ethanol (20 ml.) was added a solution of hydroxylamine hydrochloride (4.52 gm., 65 mM.) and potassium carbonate (4.14 gm., 30 mM.) in water (10 ml.). The mixture was stirred and refluxed for 24 hours, and was then concentrated in vacuo, and diluted with water. The mixture was made basic with sodium hydroxide solution, and the crude product was recovered by extraction with methylene chloride. Evaporation of the extract gave a yellow foam (1.82 gm.), which was dissolved in benzene, and purified by filtration through a column of Woelm activity III neutral alumina (18 gm.). Evaporation of the benzene eluate afforded nearly pure product as a yellow partly crystalline gum. This material became completely crystalline when triturated with ether or ether-hexane, giving the above-titled product as pale yellow prisms, M.P. 165–167° C.

EXAMPLE 2

Preparation of 5-chloro-2-(2-hydroxyethylmethylamino) benzophenone

To a stirred suspension of anhydrous aluminum chloride (79.8 gm., 0.6 mol.) in dry benzene (200 ml.) was added a solution of 2-methylamino-5-chlorobenzophenone (73.7 gm., 0.3 mol.) in dry benzene (200 ml.) during 1.5 hours. The temperature rose slowly to 40° C. The mixture was allowed to cool spontaneously to 30–35° C., and a solution of ethylene oxide (44.0 gm., 1.0 mol.) in dry benzene (100 ml.) was added dropwise during 1.5 hours, maintaining the temperature at 30–35° C. by using a water-bath. The progress of the reaction was followed by thin layer chromatography (TLC) of samples on plates of silica gel F254 (Merck), which were developed with ethyl acetate, and examined under short wave UV light. To complete the conversion two further portions of ethylene oxide were added as previously, with periods of several hours in between additions. The reaction mixture was then poured onto ice (1.5 kg.), followed by addition of concentrated hydrochloric acid (300 ml.). The aqueous acid layer was separated, and the organic layer was further extracted with 3 N-hydrochloric acid (5× 200 ml.). The combined aqueous extracts were cooled, made basic wtih 40% (w./v.) sodium hydroxide solution, and extracted with methylene chloride. The extract was washed with saturated aqueous sodium chloride, and dried over sodium sulfate. Evaporation afforded the crude product as a red oil, which was dissolved in benzene and filtered through a column of Woelm activity I neutral alumina (850 gm.). The benzene eluate was discarded; the purified product was obtained by elution of the column with methylene chloride, and evaporation of the eluate, to give 5-chloro-2-(2-hydroxyethylmethylamino) benzophenone as a yellow oil which was identical with an authentic sample by comparison of TLC and IR data.

EXAMPLE 3

Preparation of 5-chloro-2-(2-chloroethylmethylamino) benzophenone

A solution of 5-chloro-2-(2-hydroxyethylmethylamino) benzophenone (23.3 gm., 80.3 mM.) and pyridine (2 drops) in methylene chloride (200 ml.) was stirred and treated dropwise with a solution of thionyl chloride (14.4 ml., 23.8 gm., 200 mM.) in methylene chloride (80 ml.) during 1.5 hours, followed by refluxing for 2 hours, with protection from atmospheric moisture. The mixture was evaporated in vacuo and excess thionyl chloride removed by co-distillation with methylene chloride. Ice-water (200 ml.) and 3 N-sodium hydroxide solution (100 ml.) were added, and the crude product was recovered by extraction with methylene chloride. The extract was washed with saturated aqueous sodium chloride, dried over sodium sulfate, and evaporated in vacuo to give product as a dark red oil. This was dissolved in benzene, and purified by filtration through a column of Woelm activity I neutral alumina (230 gm.). Evaporation of the benzene eluate gave pure product as a yellow oil identical with an authentic sample by comparison of TLC and IR data.

EXAMPLE 4

Deoxygenation of 7-chloro-2,3-dihydro-1-methyl-5-phenyl-1H-1,4-benzodiazepine 4-oxide to 7-chloro-2,3-dihydro-1-methyl-5-phenyl-1H-1,4-benzodiazepine A solution of 7-chloro-2,3-dihydro-1-methyl-5-phenyl-1H-1,4-benzodiazepine 4-oxide (1 gm., 3.48 mM.) in methylene chloride (40 ml.) was treated with phosphorus trichloride (1 ml., 1.57 gm., 11.5 mM.), and refluxed for 0.5 hr., with protection from atmospheric moisture. The cooled reaction mixture was poured onto ice, and was then made basic with sodium hydroxide. Evaporation of the washed extracts gave V as a light brown gum which was converted into the monohydrochloride by treatment with excess methanolic hydrogen chloride, and precipitation with ether. The nearly pure 7-chloro-2,3-dihydro-1-methyl-5-phenyl - 1H - 1,4 - benzodiazepine hydrochloride was thus obtained as orange prisms, M.P. 248–250° C. (sealed tube).

We claim:
1. A process for the preparation of compounds of the formula

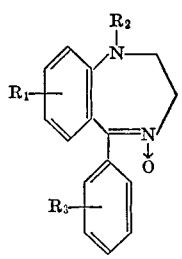

I wherein $R_1$ and $R_3$ each are selected from the group consisting of hydrogen, halogen, trifluoromethyl, nitro, amino, lower alkanoylamino, lower alkylthio, lower alkyl sulfonyl, lower alkylsulfinyl, lower alkoxy, hydroxy, lower alkyl, cyano, carboxy, carbo-lower alkoxy, carbamyl, and di-lower alkylamino; and $R_2$ is selected from the group consisting of lower alkyl, lower alkenyl and lower alkanoyl;

said process comprising reacting a compound of the following formula

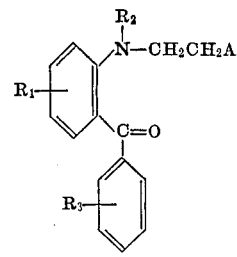

II wherein $R_1$, $R_2$ and $R_3$ are as above and A is a leaving group with hydroxylamine or an acid salt thereof.

2. The process of claim 1 wherein a compound of Formula I is prepared wherein $R_1$ is halogen, $R_2$ is lower alkyl and $R_3$ is hydrogen.

3. The process of claim 2 wherein $R_1$ is chlorine substituted at the 7-position and $R_2$ is methyl.

4. The process of claim 1 wherein a compound of Formula II is utilized wherein A is selected from the class of leaving groups consisting of tosyloxy, mesyloxy, bromo, iodo and chloro.

5. The process of claim 4 wherein A is chloro.

6. The process of claim 1 wherein said compound of Formula II is prepared by (a) reacting a compound of the following formula

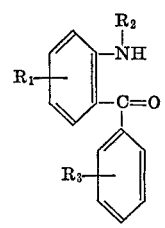

III wherein $R_1$, $R_2$ and $R_3$ are as in claim 1.

with ethylene oxide in the presence of a Lewis acid catalyst so as to produce a compound of the following formula

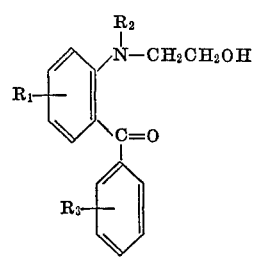

IV wherein $R_1$, $R_2$ and $R_3$ are as above and (b) reacting a compound of Formula IV above with a leaving group reagent to produce the desired compound of Formula II.

7. The process of claim 6 wherein said Lewis acid catalyst of step (a) is aluminum chloride and said leaving group reagent of step (b) is thionyl chloride.

8. The process of claim 1 wherein the product compound of said Formula I is then deoxygenated to yield a compound of the formula

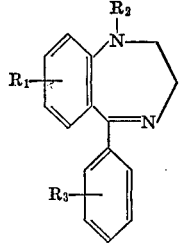

V wherein $R_1$, $R_2$ and $R_3$ are as in claim 1.

9. The process of claim 8 wherein said deoxygenation is accomplished by means of reacting said Formula I compound with phosphorous trichloride.

10. The process of claim 9 wherein $R_1$ is chlorine substituted at the 7-position, $R_2$ is methyl and $R_3$ is hydrogen.

No references cited.

ALTON D. ROLLINS, Primary Examiner

U.S. Cl. X.R.

260—456, 570